United States Patent [19]

Yamada

[11] Patent Number: 5,793,325
[45] Date of Patent: Aug. 11, 1998

[54] RADAR APPARATUS OF A VEHICLE FOR ACCURATELY DETECTING A TARGET HAVING A PATH IN A LANE OF THE VEHICLE

[75] Inventor: Yukinori Yamada, Susono, Japan

[73] Assignee: Toyota Jidosha Kabushiki Kaisha, Toyota, Japan

[21] Appl. No.: 770,732

[22] Filed: Dec. 19, 1996

[30] Foreign Application Priority Data

Feb. 19, 1996 [JP] Japan .................................. 8-030612

[51] Int. Cl.$^6$ ........................................................ G01S 13/93
[52] U.S. Cl. ................................. 342/70; 342/71; 342/81; 342/158
[58] Field of Search ........................... 342/70, 71, 72, 342/75, 81, 157, 158

[56] References Cited

U.S. PATENT DOCUMENTS

| | | | |
|---|---|---|---|
| 3,778,823 | 12/1973 | Sato et al. | 342/72 |
| 4,069,888 | 1/1978 | Wolters et al. | 342/71 X |
| 5,181,038 | 1/1993 | Ashbury et al. | 342/70 |
| 5,325,096 | 6/1994 | Pakett | 342/70 |
| 5,517,196 | 5/1996 | Pakett et al. | 342/70 |
| 5,612,699 | 3/1997 | Yamada | 342/70 |

FOREIGN PATENT DOCUMENTS 6-150195 5/1994 Japan .
7-209410 8/1995 Japan .

OTHER PUBLICATIONS

Patent Abstract of Japan re: S. Kojima et al., Object Detector, JP 6-150195 (A).

Patent Abstract of Japan re: Masashi et al., On-Vehicle Object Detecting Device, 07-209410 A.

*Primary Examiner*—John B. Sotomayor
*Attorney, Agent, or Firm*—Cushman Darby & Cushman IP Group of Pillsbury Madison & Sutro LLP

[57] ABSTRACT

A radar apparatus includes a radar unit which detects a position of a target based on a reflection beam reflected from the target and outputs data related to the detected position. A scanning control unit controls a direction of a beam radiation axis of the radar unit to the target. A certainty-factor determining unit determines a certainty factor of the target based on data presently detected by the radar unit and data previously detected by the radar unit. A certainty-factor adjusting unit controls the certainty factor such that a changing rate to the certainty factor is determined based on the data from the radar unit, the certainty factor being adjusted by the changing rate. A first changing-rate varying unit varies the changing rate to one of a plurality of predetermined values based on a target center positional angle to the target, whereby the certainty-factor adjusting unit adjusts the certainty factor by the changing rate.

10 Claims, 12 Drawing Sheets

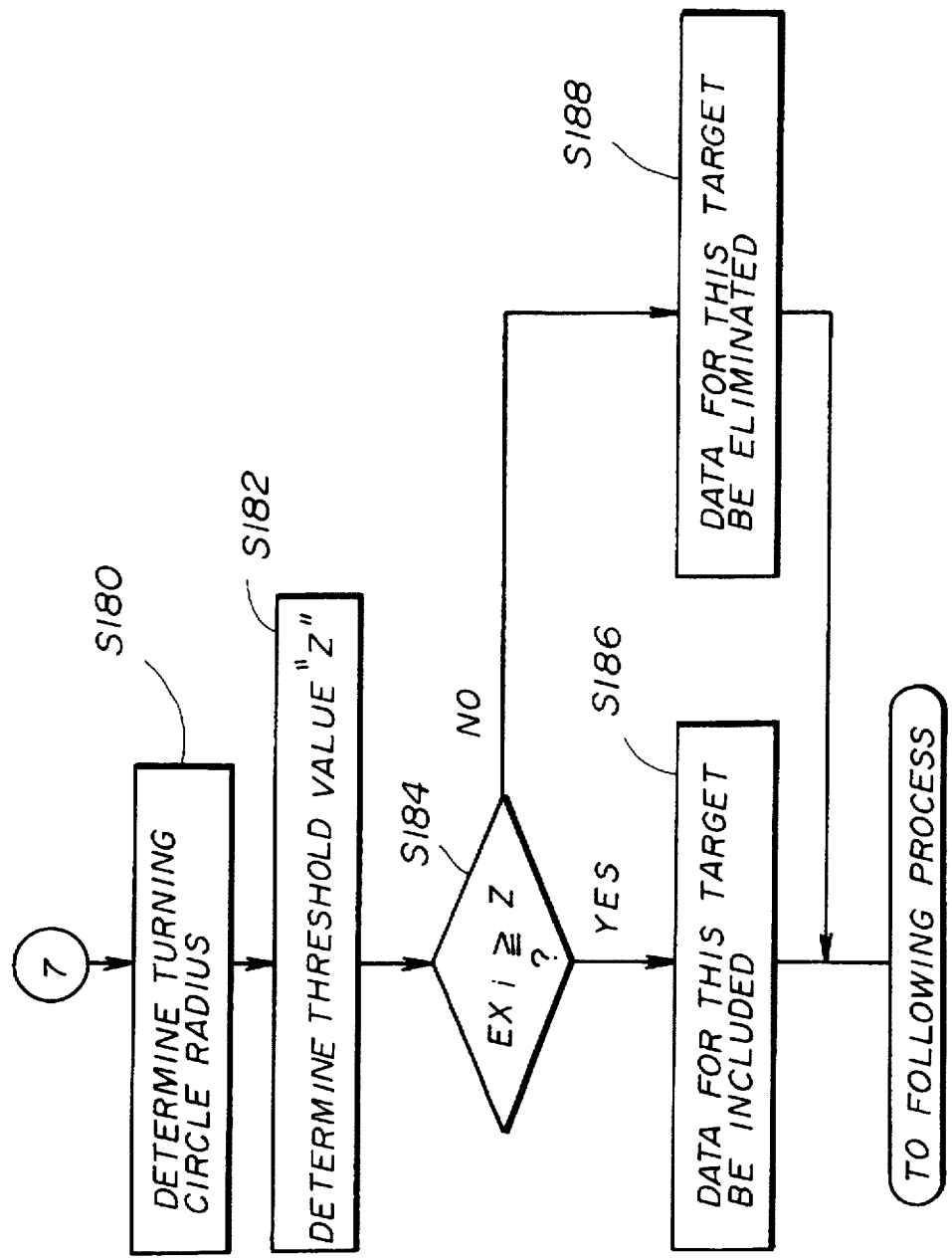

RADAR APPARATUS OF A VEHICLE FOR ACCURATELY DETECTING A TARGET HAVING A PATH IN A LANE OF THE VEHICLE

BACKGROUND OF THE INVENTION

1. Field of the Invention

The present invention generally relates to a radar apparatus of a vehicle, and more particularly to a radar apparatus which detects a target, such as a fixed obstacle or a target vehicle, in a forward direction of the vehicle based on a reflection beam reflected from the target.

2. Description of the Related Art

In recent years, a radar apparatus which radiates a radar beam to a target in a forward direction of a vehicle and detects a position of the target based on a reflection beam from the target has been developed.

Japanese Laid-Open Patent Application No. 6-150195 discloses a radar apparatus which determines a certainty factor of a target depending on whether a presently-detected position of the target and a previously-detected position of the target can be paired or correlated. The certainty factor indicates an existence probability of the target in the forward direction of the vehicle. When the presently-detected position and the previously-detected position can be paired, the certainty factor of the target is increased. When the presently-detected position and the previously-detected position cannot be paired, the certainty factor of the target is decreased.

In the apparatus of the above publication, when the determined certainty factor is above a fixed reference value, it is determined that the data of the target is used to perform a target tracking and critical-condition detecting procedure.

However, when a path of the target is in a different lane adjacent to the lane of the vehicle, it is not necessary to use the data of the target for the target tracking and critical-condition detecting procedure. In the apparatus of the above publication, if the certainty factor of the target is above the reference value, it is determined that the data of the target is used for the target tracking and critical-condition detecting procedure without differentiating whether the target is in the same lane or a different lane from the vehicle. Therefore, the prior art is inefficient in that it unnecessarily performs target tracking and critical condition-detecting procedures for targets in a different lane of the vehicle and thus are not a threat to the vehicle. What is needed is an invention which efficiently performs the target tracking and critical-condition detecting procedure by detecting whether a target is in the same lane or different lane prior to tracking and critical-condition detection.

SUMMARY OF THE INVENTION

An object of the present invention is to provide an improved radar apparatus in which the above-described problems are eliminated.

Another object of the present invention is to provide a radar apparatus which accurately detects a target having a path in a lane of the vehicle by varying a changing rate for adjustment of a certainty factor of the target based on a target center positional angle to the target, so that a target tracking and critical-condition detecting procedure is efficiently performed.

The above-mentioned objects of the present invention are achieved by a radar apparatus which includes: a radar unit which detects a position of a target based on a reflection beam reflected from the target and outputs data related to the detected position; a scanning control unit which controls a direction of a beam radiation axis of the radar unit to the target; a certainty-factor determining unit which determines a certainty factor of the target based on data presently detected by the radar unit and data previously detected by the radar unit; a certainty-factor adjusting unit which controls the certainty factor such that a changing rate to the certainty factor is determined based on the data from the radar unit, the certainty factor being adjusted by the changing rate; and a first changing-rate varying unit which varies the changing rate to one of a plurality of predetermined values based on a target center positional angle to the target, whereby the certainty-factor adjusting unit adjusts the certainty factor by the changing rate.

The radar apparatus of the present invention allows the target tracking and critical-condition detecting procedure to be efficiently performed by accurately detecting the target having a path in the lane of the vehicle. The radar apparatus of the present invention appropriately varies the changing rate for adjustment of the certainty factor depending on whether the path of the target is in the lane of the vehicle or in another lane. Therefore, it is possible for the radar apparatus of the present invention to remarkably increase the accuracy of lane discrimination of the target which detects whether the path of the target is in the lane of the vehicle or in another lane.

BRIEF DESCRIPTION OF THE DRAWINGS

Other objects, features and advantages of the present invention will become more apparent from the following detailed description when read in conjunction with the accompanying drawings in which:

FIGS. 3 through 9 are a target-recognition flowchart for explaining a target recognition routine performed by a target recognition unit of the radar signal processing system in FIG. 2;

FIG. 3 is the first phase of the target-recognition flowchart which indicates connecting points 1,2 and 3 to other phases of the target-recognition flowchart contains in the following FIGS. 4 and 5.

FIG. 4 is the second phase of the target-recognition flowchart which indicates the connecting points 1,2 and 3 to FIGS. 3 and 5.

FIG. 5 is the third phase of the target-recognition flowchart which indicates connecting point 3 to FIG. 4 and connecting point 4 to FIG. 6.

FIG. 6 is the fourth phase of the target-recognition flowchart which indicates the connecting point 4 to FIG. 5 and connecting point 5 to FIG. 7.

FIG. 7 is the fifth phase of the target-recognition flowchart which indicates the connecting point 5 to FIG. 6 and connecting point 6 to FIG. 8.

FIG. 8 is the sixth phase of the target-recognition flowchart which indicates the connecting point 6 to FIG. 7 and connecting point 7 to FIG. 9.

FIG. 9 is the seventh phase of the target-recognition flowchart which indicates the connecting point 7 to FIG. 8.

DETAILED DESCRIPTION OF THE PREFERRED EMBODIMENT

A description will now be given of the preferred embodiment of the present invention with reference to the accompanying drawings.

Figure 2:
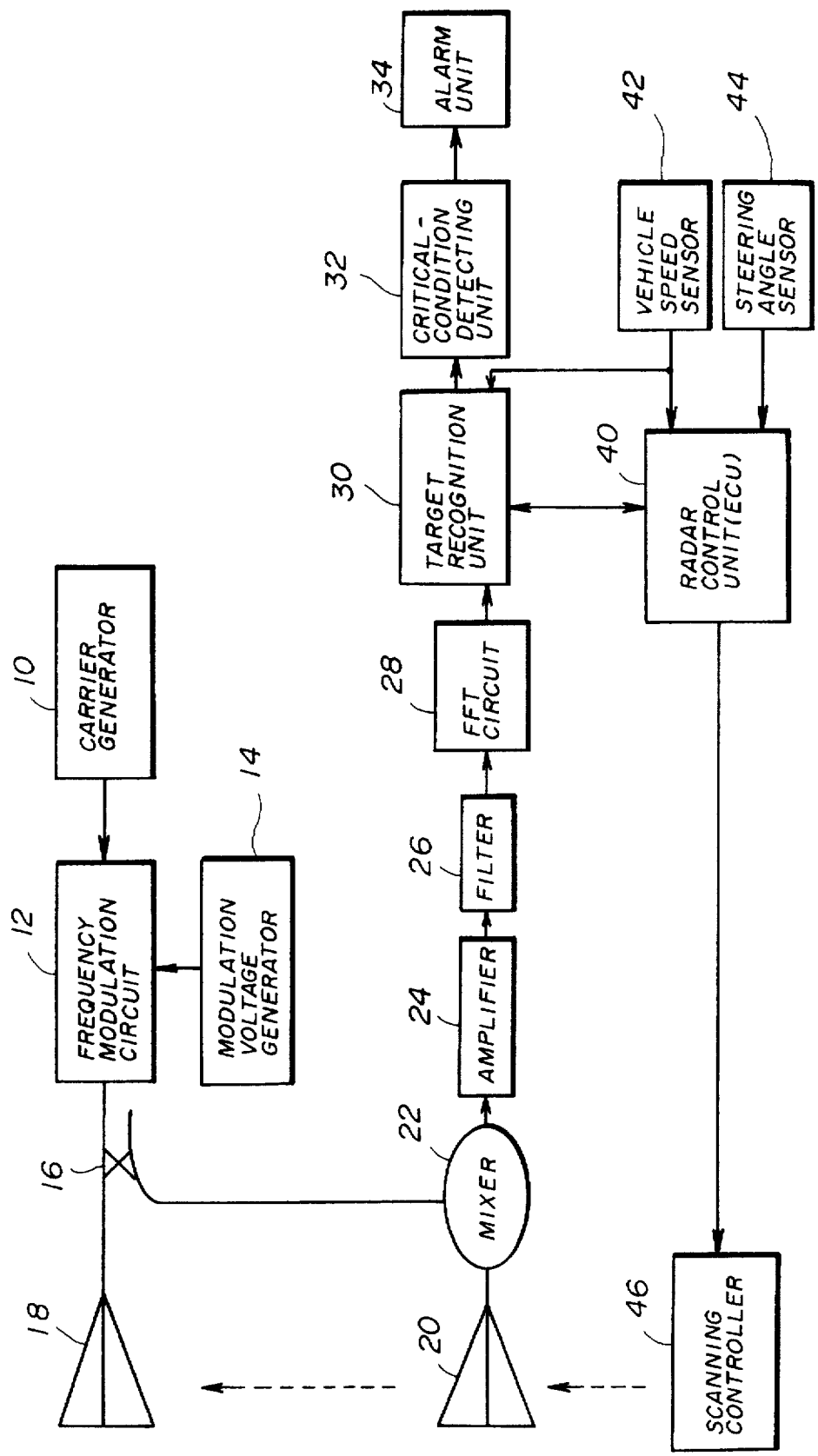
FIG. 2 is a block diagram of a radar signal processing system to which one embodiment of the present invention is applied.

FIG. 2 shows a radar signal processing system to which one embodiment of the present invention is applied. A radar apparatus in the present embodiment is applied to the radar signal processing system in FIG. 2.

Referring to FIG. 2, the radar signal processing system has a transmitting part and a receiving part. The transmitting part comprises a carrier generator 10, a frequency modulation circuit 12, a modulation voltage generator 14, a directional coupler 16, and a transmitting antenna 18.

The carrier generator 10 outputs a carrier signal with a given frequency, and supplies the carrier signal to the frequency modulation circuit 12.

The modulation voltage generator 14 outputs a modulation voltage signal having an amplitude varied in triangular form, and supplies the modulation voltage signal to the frequency modulation circuit 12.

The frequency modulation circuit 12 outputs a frequency-modulated signal from the carrier signal from the carrier generator 10. The modulated signal is generated at the output of the frequency modulation circuit 12 by modulating the frequency of the carrier signal in accordance with the modulation voltage signal from the modulation voltage generator 14. The modulated signal, having a frequency varied in triangular form as time elapses is supplied as a radiation signal to the transmitting antenna 18 through the directional coupler 16. A radar beam from the transmitting antenna 18 is radiated to a target in a forward direction of a vehicle.

The receiving part of the radar signal processing system in FIG. 2 comprises a receiving antenna 20, a mixer 22, an amplifier 24, a filter 26, an FFT (Fast-Fourier-Transform) circuit 28, a target recognition unit 30, a critical-condition detecting unit 32, and an alarm unit 34.

The directional coupler 16 is connected to the mixer 22, and the radiation signal from the frequency modulation circuit 12 is also supplied to the mixer 22.

If there is a target in the forward direction of the vehicle, a reflection signal which is a reflection beam reflected off the target is received at the receiving antenna 20.

The receiving antenna 20 is connected to the mixer 22, and the reflection signal from the receiving antenna 20 is supplied to the mixer 22. The mixer 22 performs a mixing of the modulated signal from the directional coupler 16 and the reflection signal from the receiving antenna 20, and generates beat signals at an output of the mixer 22 as a result of the mixing. The frequencies of the beat signals at the output of the mixer 22 are changed based on the difference between the radiation signal frequency and the reflection signal frequency.

The beat signals from the mixer 22 are supplied to the filter 26 after they have been amplified by the amplifier 24. The filter 26 is, for example, an antialiasing filter. The beat signals from the amplifier 24 are separated into beat signals of "up periods" and "down periods" by the filter 26. These beat signals from the filter 26 are supplied to the FFT circuit 28.

Hereinafter, the frequency of the beat signal generated in the "up period" during which the frequency of the radiation signal is increasing is called the up-frequency, and the frequency of the beat signal generated in the "down period" during which the frequency of the radiation signal is decreasing is called the down-frequency.

The FFT circuit 28 outputs a power spectrum of the frequencies of the beat signals of the "up periods" through fast Fourier transform, and outputs a power spectrum of the frequencies of the beat signals of the "down periods" through fast Fourier transform.

The power spectrums of the up-frequencies and the down-frequencies are supplied from the FFT circuit 28 to the target recognition unit 30.

The target recognition unit 30 performs a pairing of a peak frequency in the power spectrum of the up-frequencies and a peak frequency in the power spectrum of the down-frequencies among those supplied from the FFT circuit 28. As a result of the pairing by the target recognition unit 30, a plurality of pairs of the peak frequencies for a plurality of targets may be produced.

Usually, the target recognition unit 30 processes about twenty targets including running vehicles and fixed obstacles on the road. If the targets include the running vehicles only, the target recognition unit 30 processes not more than five target vehicles.

For one of the pairs of peaks related to one of the targets, the target recognition unit 30 detects a peak frequency "fup" from the power spectrum of the up-frequencies and a peak frequency "fdwn" from the power spectrum of the down-frequencies. The target recognition unit 30 determines a relative-speed frequency "fd" and a relative-distance frequency "fr" from the peak frequency "fup" and the peak frequency "fdwn" in accordance with the following equations:

$$fd=(fdwn-fup)/2 \qquad (a)$$

$$fr=(fdwn+fup)/2 \qquad (b)$$

Further, the target recognition unit 30 determines a relative distance "R" and a relative speed "V" from the relative-speed frequency fd and the relative-distance frequency fr in accordance with the following equations:

$$fd=2 \cdot V/C \cdot fo \qquad (c)$$

$$fr=4 \cdot fm \cdot df/C \cdot R \qquad (d)$$

where fd is the relative-speed frequency, fr is the relative-distance frequency, C is the speed of light, fo is the center frequency of the modulation voltage signal by the modulation voltage generator 14, fm is the frequency of the modulated signal by the frequency modulation circuit 12, and df is the frequency change width of the modulated signal.

The relative distance R and the relative speed V of each target is supplied from the target recognition unit 30 to the critical-condition detecting unit 32.

The critical-condition detecting unit 32 detects whether the relative distance between the vehicle and the target is greater than a safety distance. The safety distance may be predetermined or calculated based on a current operating condition of the vehicle. When the relative distance between the vehicle and the target is less than the safety distance, it is determined that the vehicle is in a critical condition with the target.

When the critical-condition detecting unit 32 determines that the vehicle is in the critical condition with the target, the alarm unit 34 provides a warning of the critical condition for a vehicle operator.

The radar signal processing system in FIG. 2 further includes a radar control unit 40, a vehicle speed sensor 42, a steering angle sensor 44, and a scanning controller 46. The radar control unit 40 is an electronic control unit (ECU) for controlling the radar unit of the present embodiment.

The vehicle speed sensor 42 and the steering angle sensor 44 are connected to inputs of the radar control unit 40. A vehicle speed "Vs" output by the vehicle speed sensor 42 and a steering angle "θh" output by the steering angle sensor 44 are supplied to the radar control unit 40. The target recognition unit 30 and the radar control unit 40 are interconnected, and the relative distance "R" from the target recognition unit 30 is supplied to the radar control unit 40.

The radar control unit 40 determines a radius of curvature "r" of a curved path as well as a scanning angle "θs" from the vehicle speed Vs, the steering angle θh, and the relative distance R in accordance with the following equations:

$$\theta s = \sin^{-1}(R/2r) \quad (e)$$

$$r = (1 + K1 \cdot VS^2) \cdot K2/\theta h \quad (f)$$

where K1 and K2 are predetermined coefficients (constant). The radius of curvature "r" of the curved path is related to the forward direction of the vehicle. The scanning angle θs is related to the beam radiation axis of the radar unit to which the direction of each of the transmitting antenna 18 and the receiving antenna 20 is moved by the scanning controller 46.

The steering angle θh from the steering angle sensor 44 is zero when a steering wheel of the vehicle is not turned and the forward direction of the vehicle remains unchanged. The steering angle θh is positive (greater than zero) when the steering wheel is turned to the left of the forward direction of the vehicle, and it is negative (smaller than zero) when the steering wheel is turned to the right of the forward direction of the vehicle.

The radar control unit 40 controls the scanning controller 46 such that the beam radiation axis of the radar unit is moved to the intended direction by the scanning controller 46 in accordance with the scanning angle θs. Therefore, the direction in which each of the transmitting antenna 18 and the receiving antenna 20 is to be moved by the scanning controller 46 is controlled by using the scanning angle θs.

The vehicle speed sensor 42 is connected to the target recognition unit 30, and the vehicle speed "Vs" from the vehicle speed sensor 42 is supplied to the target recognition unit 30.

FIGS. 3 through 9 show a target recognition routine performed by the target recognition unit 30. The execution of this routine is started at intervals of a predetermined time. The predetermined time is preset to several tens of milliseconds.

Figure 3:
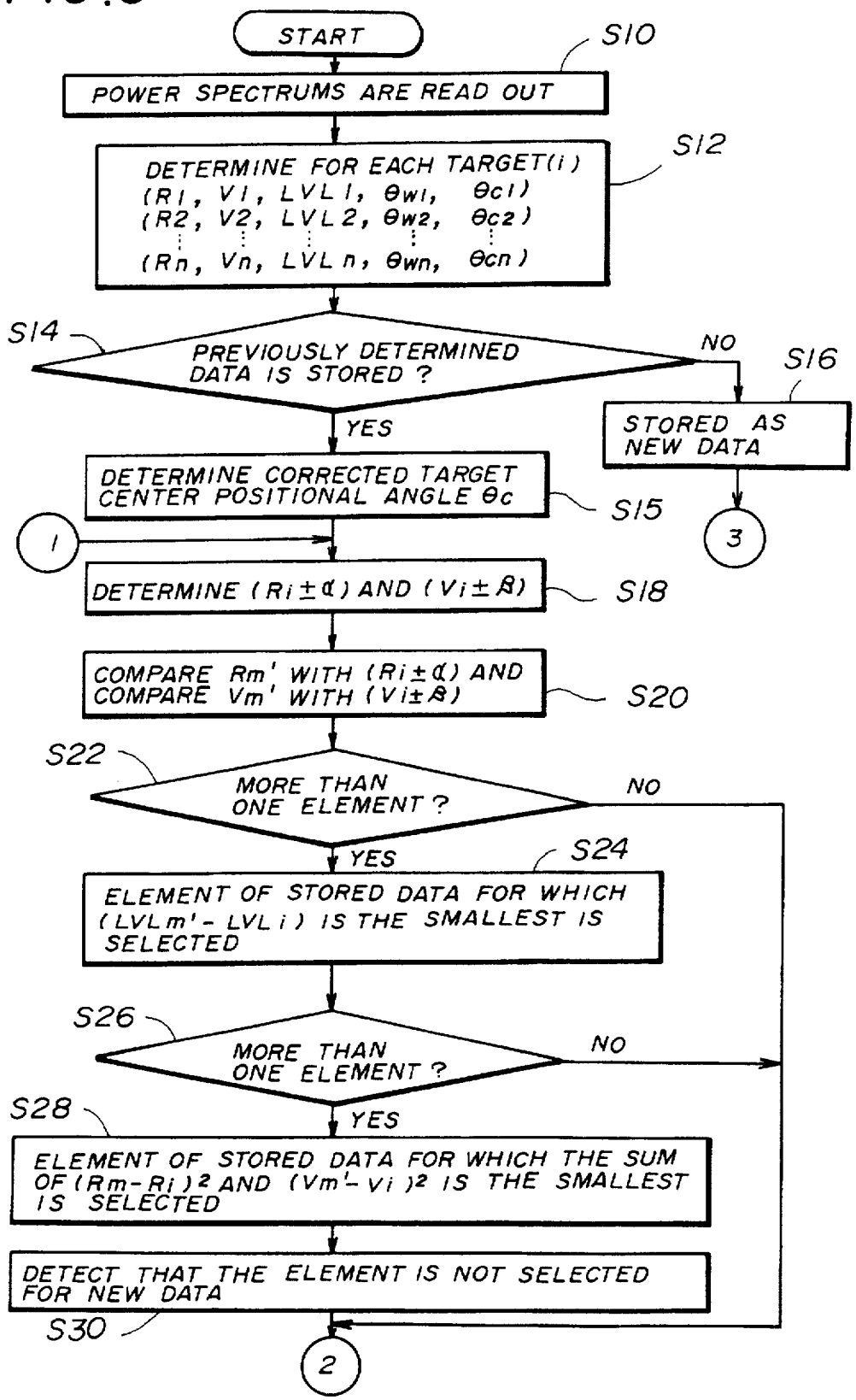

Referring to FIG. 3, the target recognition unit 30, at step S10, reads out the power spectrum of the up-frequencies and the power spectrum of the down-frequencies from the FFT circuit 28.

Step S12 determines, for each of a plurality of targets, a relative distance "R", a relative speed "V", and a reflection beam level "LVL" from the power spectrum of the up-frequencies and the power spectrum of the down-frequencies in accordance with the above equations (a) through (d). The data of each target is determined by the target recognition unit 30 based on the reflection beam level of the target.

Further, step S12 determines, for each target, a vehicle angle θw and a target center positional angle θc. The vehicle angle θw is determined based on the difference between a scanning angle to the left end of the target and a scanning angle to the right end of the target. The target center positional angle θc is determined by the average of a scanning angle to the left end of the target and a scanning angle to the right end of the target. The target center positional angle θc indicates the direction of the beam radiation axis of the radar unit to the center of the target.

Therefore, the data of each target (i), including the relative distance Ri, the relative speed Vi, the reflection beam level LVLi, the vehicle angle θwi, and the target center positional angle θci, is determined by the target recognition unit 30 at the step S12.

Step S14 detects whether the presently-determined data which is the same as that previously determined at the previous cycle is stored in a memory of the target recognition unit 30.

When the result at the step S14 is negative, step S16 is performed. Step S16 stores the presently-determined data (R, V, LVL, θw, θc) in the memory as new data for a new target. After the step S16 is performed, the control is transferred to step S60 of FIG. 5. The existence probability of the new target (stored as the new data) is initially set at 5% (constant).

When the result at the step S14 is affirmative, step S15 is performed. Step S15 determines a corrected target center positional angle θc to the target whose data is stored by averaging all the previously-determined elements of the target center positional angles eci by filtering. The corrected target center positional angle θc is obtained in order to eliminate any possible deviation in the previously-determined elements of the target center positional angles.

Step S18 determines a relative distance range "Ri±α" for a new target (i), and a relative speed range "Vi±β" for the new target (i). These ranges are determined for the new target (i) such that the relative distance and the relative speed are inclusive of errors which may be produced with the radar apparatus when the vehicle abruptly accelerates or decelerates.

Step S20 compares each of the relative distances Rm' in the stored data with the relative distance range Ri±α, and compares each of relative speeds Vm' in the stored data with the relative speed range Vi±β.

The comparison of the relative distance Rm' with the relative distance range Ri±α and the comparison of the relative speed Vm' with the relative speed range Vi±β at the step S20 are performed for all the elements of the relative distances Rm' and/or the relative speeds Vm' in the stored data. As a result, the target recognition unit 30 determines how many elements in the stored data are included in both the relative distance range and the relative speed range.

Step S22 detects whether more than one element of the relative distances Rm' in the stored data is included in both the relative distance range Ri±α, and detects whether more than one element of the relative speeds Vm' in the stored data is included in the relative speed range Vi±β.

When the result at the step S22 is affirmative, step S24 is performed. Otherwise the control is transferred to step S40 in FIG. 4.

Step S24 selects any of the elements of the stored data for which the difference "LVLm'−LVLi" is the smallest, where LVLm' is the reflection beam level in the stored data for the selected element, and LVLi is a central reflection beam level for the new target (i). This step S24 is useful because the reflection beam level for the same target does not greatly change during a short time period.

Step S26 detects whether there is more than one element of the stored data for which the difference "LVLm'−LVLi" is the smallest.

When the result at the step S26 is affirmative, step S28 is performed. Otherwise the control is transferred to step S40 of FIG. 4.

Step S28 selects one of the elements of the stored data for which the sum of $(Rm'-Ri)^2$ and $(Vm'-Vi)^2$ is the smallest, where Rm' and Vm' are the relative distance and the relative speed in the stored data for the selected element, and Ri and Vi are a central relative distance and a central relative speed for the new target (i).

After the step S28 is performed, step S30 detects that the element of the stored data selected at the step S28 is not selected for the new data. After the step S30 is performed, the control is transferred to step S40 in FIG. 4.

Figure 4:
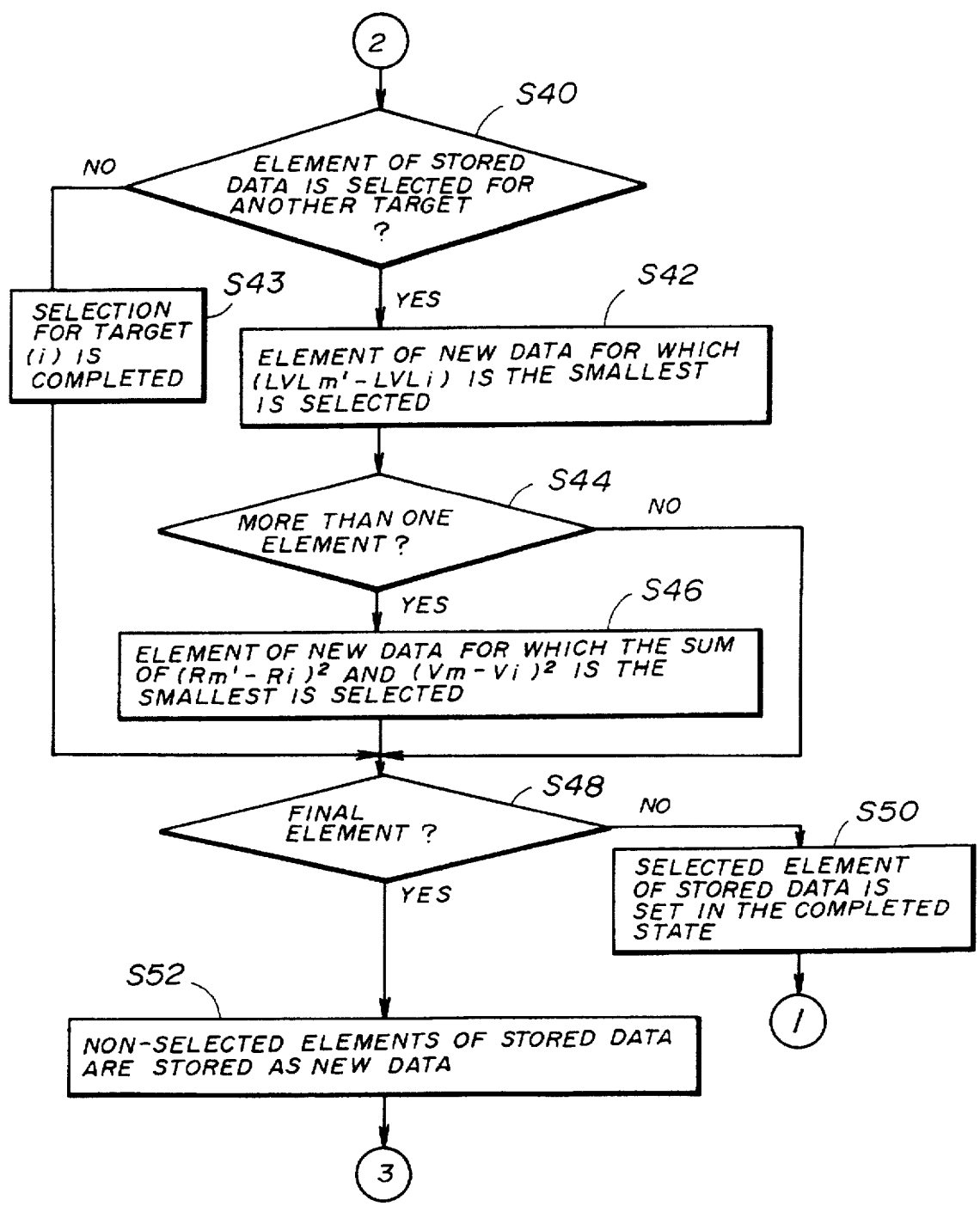

Referring to FIG. 4, step S40 detects whether the element of the stored data is selected for another target.

When the result at the step S40 is affirmative, step S42 is performed. Otherwise step S43 is performed. Step S43 completes the selection of the element of the stored data for the new target (i). After the step S43 is performed, the control is transferred to step S48 in FIG. 4.

Step S42 selects any of the elements of the new data for which the difference "LVLm'−LVLi" is the smallest, where LVLm' is the reflection beam level in the stored data for the selected element, and LVLi is one of the reflection beam levels for the elements of the new data.

Step S44 detects whether there is more than one element of the new data for which the difference "LVLm'−LVLi" is the smallest.

When the result at the step S44 is affirmative, step S46 is performed. Otherwise the control is transferred to step S48 of FIG. 4.

Step S46 selects one of the elements of the new data for which the sum of $(Rm'-Ri)^2$ and $(Vm'-Vi)^2$ is the smallest, where Rm' and Vm' are the relative distance and the relative speed in the stored data for the selected element, and Ri and Vi are a central relative distance and a central relative speed for the more than one element of the new data which meets the requirement of the step S44.

After the step S46 is performed, step S48 detects whether the selected element of the new data of the target (i) is the final element of the presently-determined data.

When the result at the step S48 is negative, step S50 is performed. Step S50 sets the selected element of the stored data in the completed state. Thus, the selection of the element of the stored data for the new target (i) is completed at the step S50. After the step S50 is performed, the control is transferred to the step S18 in FIG. 3. For the next new target, the same procedures as the steps S18–S46 are repeated.

When the result at the step S48 is affirmative, step S52 is performed. Step S52 stores the non-selected elements of the stored data in the memory as the new data. After the step S52 is performed, the control is transferred to step S60 in FIG. 5.

Figure 5:
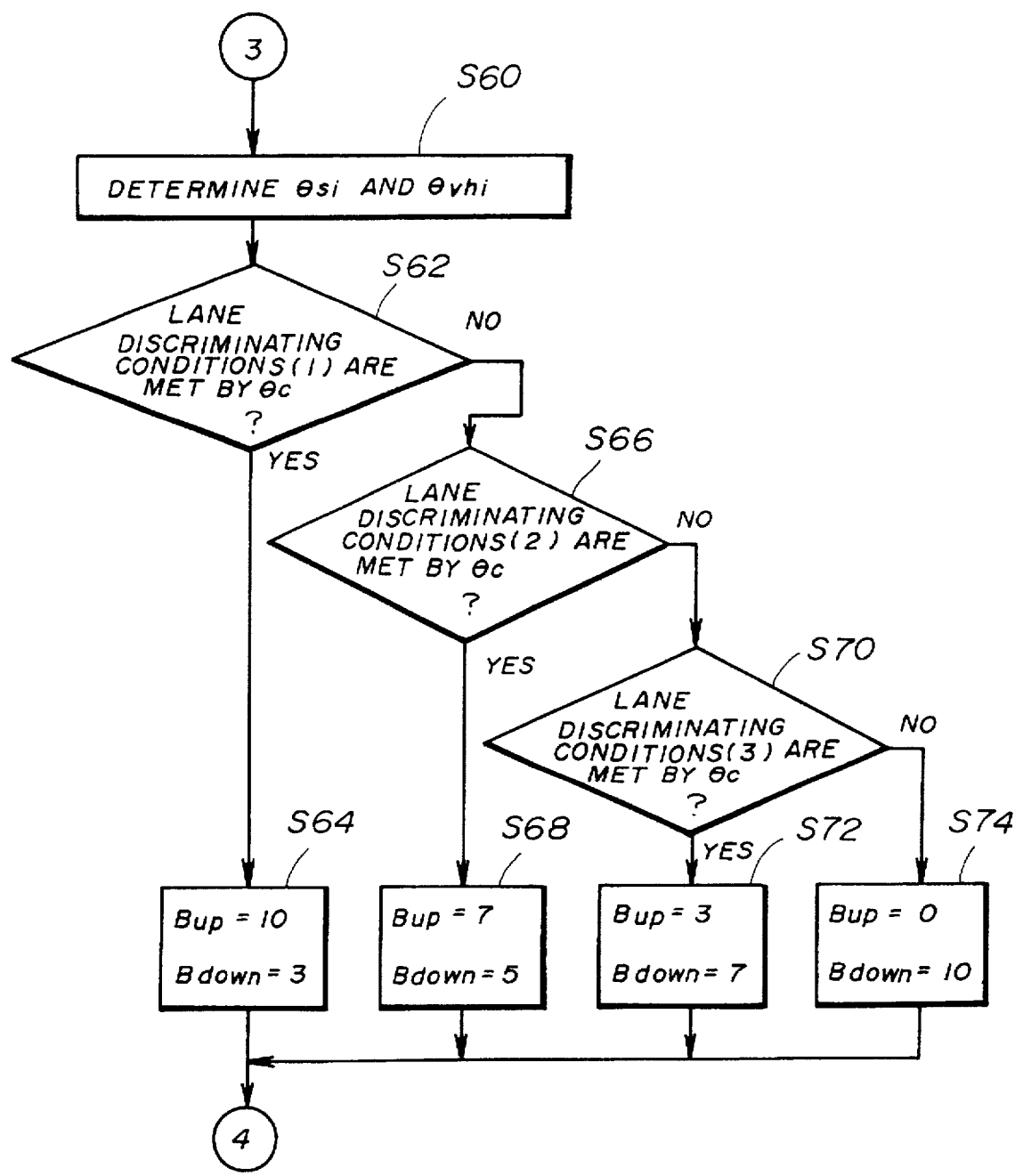

Referring to FIG. 5, step S60 determines the scanning angle θsi and the vehicle-width angle θvhi for the target (i) in accordance with the following equations:

$$\theta si = \sin^{-1}(Ri/2r) \qquad (e')$$

$$\theta vhi = \tan^{-1}(W/2Ri) \qquad (g)$$

where Ri is the relative distance between the vehicle and the target, r is the radius of curvature of a curved path, and W is a predetermined vehicle width of the target. The vehicle width W in the present embodiment is preset at 2 m (meter) which is considered a standard vehicle width.

Figure 10A:
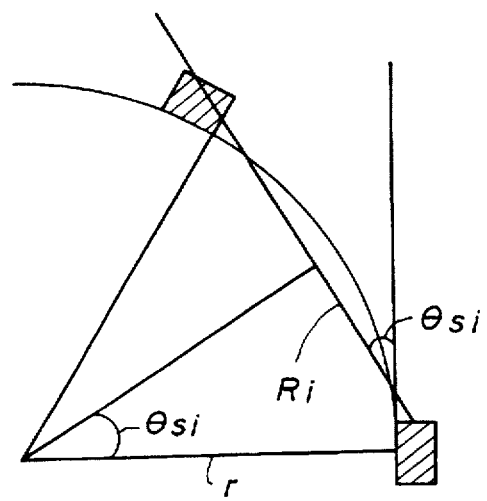
FIGS. 10A and 10B are diagrams for explaining a scanning angle and a vehicle-width angle.
Figure 10B:
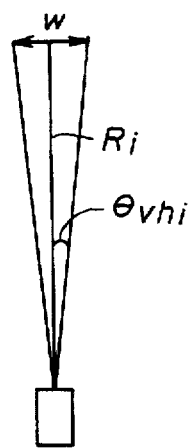

FIG. 10A shows a scanning angle θsi when the target and the vehicle are running in a curved path. FIG. 10B shows a vehicle-width angle θvhi of a target having the vehicle width W. As shown, the scanning angle θsi indicates the angle between the beam radiation direction of the radar unit and the forward direction of the vehicle, and the vehicle-width angle θvhi indicates half the angle which the beam radiation axis of the radar unit covers for the vehicle width W.

Step S62 detects whether the following lane discriminating conditions (1) are met by the target center positional angle eci to the target (i):

$$\theta si - \theta vhi \leq \theta ci \leq \theta si + \theta vhi \qquad (1)$$

When the result at the step S62 is affirmative (the above lane discriminating conditions (1) are met), step S64 is performed. Step S64 sets the rate of increase "Bup" to the existence probability of the target at 10% which is the greatest probability, and sets the rate of decrease "Bdown" to the existence probability of the target at 3% which is the smallest probability.

In the above lane discriminating conditions (1), an allowance factor which indicates an allowance of the target center positional angle related to the path of the target is set at zero.

When the result at the step S62 is negative (the above conditions (1) are not met), step S66 is performed. Step S66 detects whether the following lane discriminating conditions (2) are met by the target center positional angle eci to the target (i):

$$\theta si - \theta vhi - 0.5 \leq \theta ci \leq \theta si + \theta vhi + 0.5 \qquad (2)$$

When the result at the step S66 is affirmative (the above conditions (2) are met), step S68 is performed. Step S68 sets the rate of increase "Bup" to the existence probability of the target at 7% which is the second greatest probability, and sets the rate of decrease "Bdown" to the existence probability of the target at 5% which is the third greatest probability.

In the above lane discriminating conditions (2), the allowance factor is set at 0.5.

When the result at the step S66 is negative (the above conditions (2) are not met), step S70 is performed. Step S70 detects whether the following lane discriminating conditions (3) are met by the target center positional angle eci to the target (i):

$$\theta si - \theta vhi - 1.0 \leq \theta ci < \theta si + \theta vhi + 1.0 \qquad (3)$$

When the result at the step S70 is affirmative (the above conditions (3) are met), step S72 is performed. Step S72 sets the rate of increase "Bup" to the existence probability of the target at 3% which is the third greatest probability, and sets the rate of decrease "Bdown" to the existence probability of the target at 7% which is the second greatest probability.

When the result at the step S70 is negative (the above conditions (3) are not met), step S74 is performed. Step S74 sets the rate of increase "Bup" to the existence probability of the target at 0% which is the smallest probability, and sets the rate of decrease "Bdown" to the existence probability of the target at 10% which is the greatest probability.

In the above lane discriminating conditions (3), the allowance factor is set at 1.0.

Figure 6:
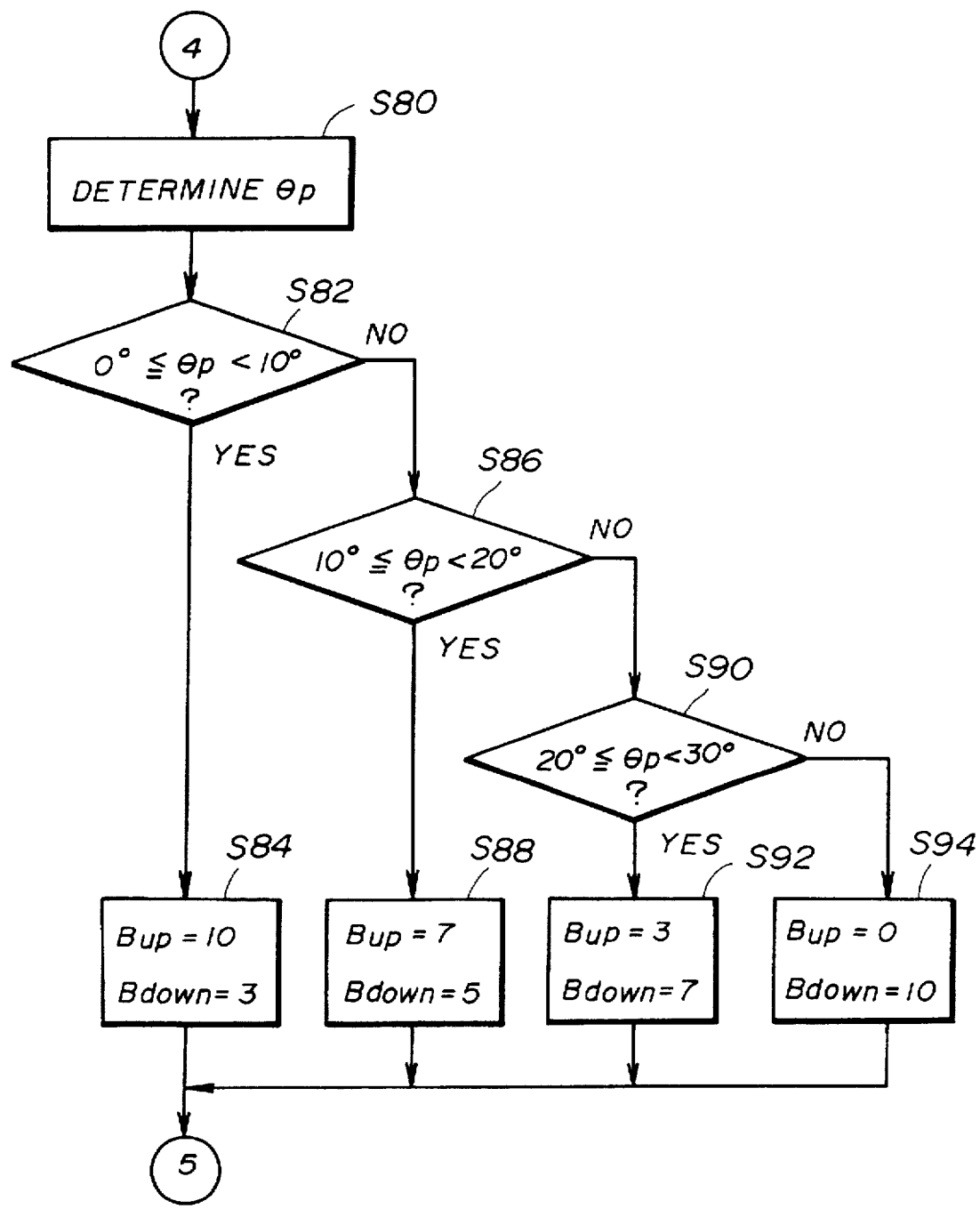

After one of the steps S64, S68, S72, and S74 is performed, the control is transferred to step S80 in FIG. 6.

As described above, each of the lane discriminating conditions (1), (2) and (3) is defined by the scanning angle θsi, the vehicle-width angle θvhi, and the allowance factor.

Figure 11:
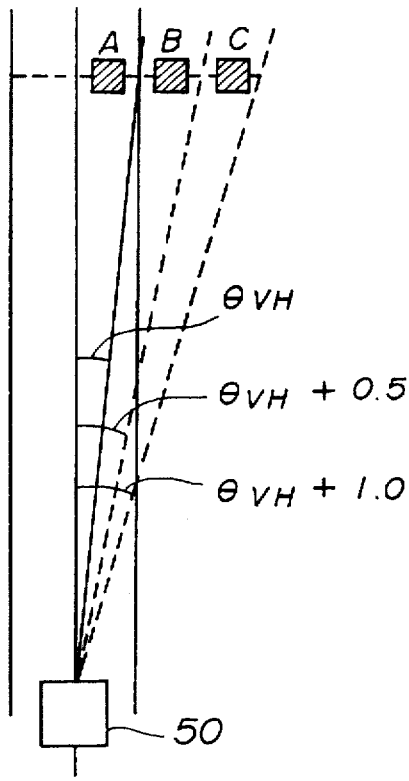
FIG. 11 is a diagram for explaining lane discriminating conditions used in the target recognition routine in FIG. 5.

FIG. 11 is useful for explaining the lane discriminating conditions used in the target recognition routine in FIG. 5. The relationship between the scanning angles of the radar unit to targets "A", "B" and "C" and the paths of the targets when the vehicle 50 is running in a straight path is shown in FIG. 11.

As shown in FIG. 11, when the path of a target "A" is located in a first region (1) in which the above conditions (1) are met, the probability of existence of the target in the lane of the vehicle 50 is highest. In the present embodiment, at this time, the rate of increase Bup to the existence probability of the target is set at the greatest level, and the rate of decrease Bdown to the existence probability of the target is set at the smallest level.

When the path of a target is located in a second region (2) in which the above conditions (2) are met, the probability of existence of the target in the lane of the vehicle 50 is lower than that of the case of the first region (1). In the present embodiment, at this time, the rate of increase Bup to the existence probability of the target is set at the second greatest level, and the rate of decrease Bdown to the existence probability of the target is set at the third greatest level.

When the path of a target is located in a third region (3) in which the above conditions (3) are met, the probability of existence of the target in the lane of the vehicle 50 is lower than that of the case of the second region (2). In the present embodiment, at this time, the rate of increase Bup to the existence probability of the target is set at the third greatest level, and the rate of decrease Bdown to the existence probability of the target is set at the second greatest level.

Further, when the path of a target is located in a fourth region (4) in which the above conditions (3) are not met, the probability of existence of the target in the lane of the vehicle 50 is lowest. In the present embodiment, at this time, the rate of increase Bup to the existence probability of the target is set at the smallest level, and the rate of decrease Bdown to the existence probability of the target is set at the greatest level.

In the present embodiment, the detection range for the target in the forward direction of the vehicle is divided into the first through fourth regions. The detection range in the present embodiment may be modified by changing the reference range of the target center positional angle to the target in a different, suitable manner. The detection range of a modification of the present embodiment can be divided into a greater number of regions in order to provide a higher level of accuracy of lane discrimination of the target.

It is possible for the radar apparatus of the present invention to provide a high level of accuracy of target recognition which determines the probability of existence of the target having a path in the lane of the vehicle. The radar apparatus of the present invention provides a quantitative expression to the existence probability of the target in the forward direction of the vehicle.

Figure 12:
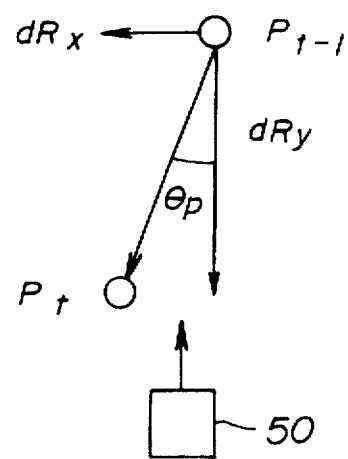
FIG. 12 is a diagram for explaining a positional-change angle.

Referring to FIG. 6, step S80 determines a positional-change angle θp of the target as shown in FIG. 12.

In FIG. 12, the positional-change angle θp when the position of the target to the vehicle 50 has changed from a previously-detected position P(t−1) to a presently-detected position P(t) is shown.

As shown in FIG. 12, the previously-detected position P(t−1) is indicated by a relative distance R(t−1) and a target center positional angle θc(t−1). The presently-detected position P(t) is indicated by a relative distance R(t) and a target center positional angle θc(t). In an example, suppose that the forward direction of the vehicle 50 is the direction y, and the direction perpendicular to the forward direction of the vehicle 50 is the direction x. A change in two-dimensional position of the target to the vehicle 50 during an interval of time from "t−1" to "t" is indicated by an x-direction component "dRx" and a y-direction component "dRy", as follows.

$$dRx = R(t)\cdot\tan\theta c(t) - R(t-1)\cdot\tan\theta c(t-1) \quad (4)$$

$$dRy = R(t) - R(t-1) \quad (5)$$

In the above equations (4) and (5), the values of θc(t) and θc(t−1) are considered sufficiently small.

Accordingly, the target recognition unit 30 at the step S80 determines the positional-change angle θp from the dRx and the dRy in accordance with the equation:

$$\theta p = \tan^{-1}(dRx/dRy) \quad (6)$$

Step S82 detects whether the first requirement conditions: 0°≦|θp|<10° are met by the positional-change angle θp.

When the result at the step S82 is affirmative (the first conditions are met), step S84 is performed. Step S84 sets the rate of increase Bup to the existence probability of the target at 10% which is the greatest probability, and sets the rate of decrease Bdown to the existence probability of the target at 3% which is the smallest probability.

When the result at the step S82 is negative (the first conditions are not met), step S86 is performed. Step S86 detects whether the second requirement conditions: 10°≦|θp|<20° are met by the positional-change angle θp.

When the result at the step S86 is affirmative (the second conditions are met), step S88 is performed. Step S88 sets the rate of increase Bup to the existence probability of the target at 7% which is the second greatest probability, and sets the rate of decrease Bdown to the existence probability of the target at 5% which is the third greatest probability.

When the result at the step S86 is negative (the second conditions are not met), step S90 is performed. Step S90 detects whether the third requirement conditions: 20°≦|θp|<30° are met by the positional-change angle θp.

When the result at the step S90 is affirmative (the third conditions are met), step S92 is performed. Step S92 sets the rate of increase Bup to the existence probability of the target at 3% which is the third greatest probability, and sets the rate of decrease Bdown to the existence probability of the target at 7% which is the second greatest probability.

When the result at the step S90 is negative (the third conditions are not met), step S94 is performed. Step S94 sets the rate of increase Bup to the existence probability of the target at 0% which is the smallest probability, and sets the rate of decrease Bdown to the existence probability of the target at 10% which is the greatest probability.

Figure 7:
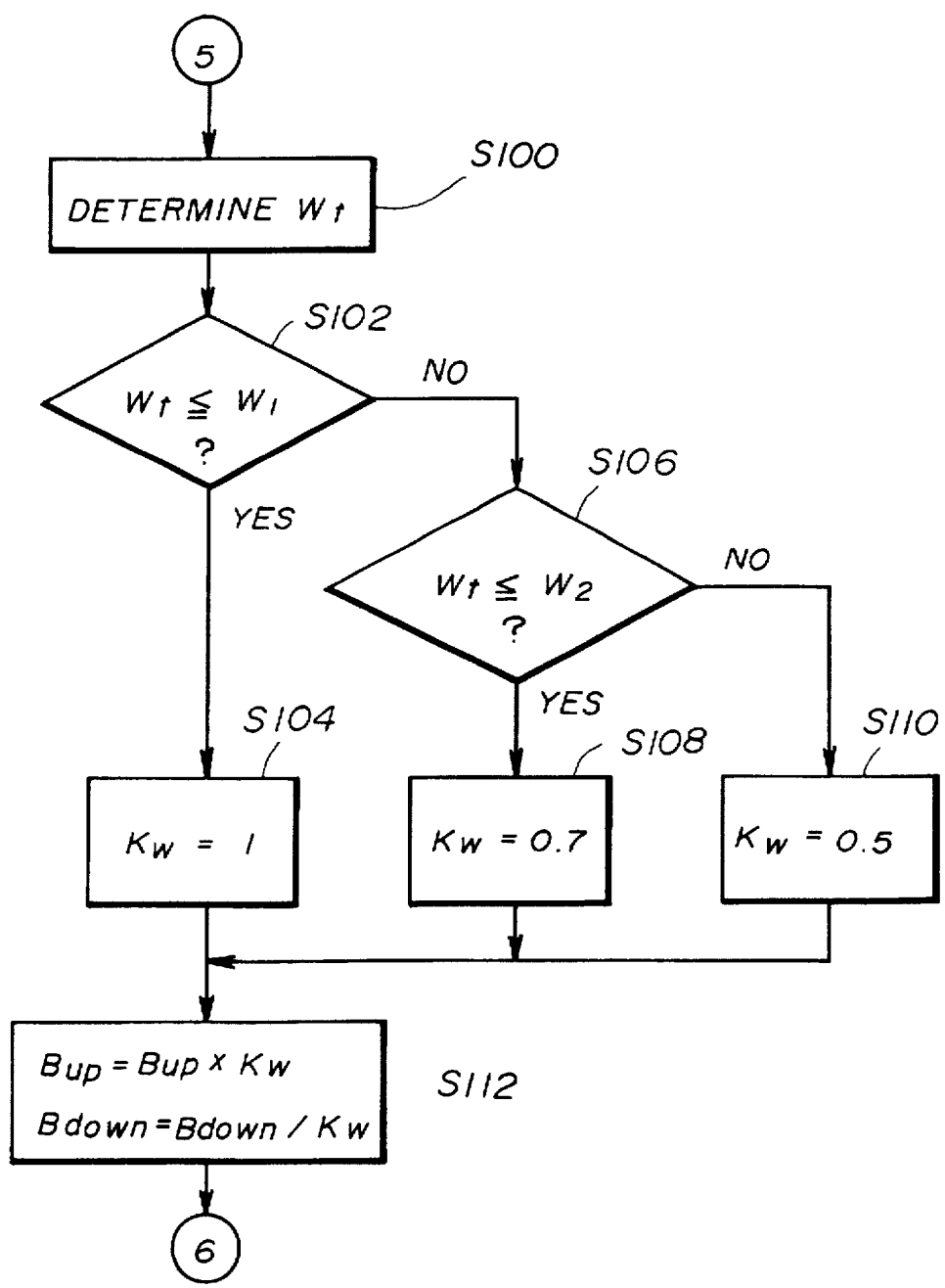

After one of the steps S84, S88, S92, and S94 is performed, the control is transferred to step S100 in FIG. 7.

The detection range of the positional-change angle in the present embodiment may be modified by changing the upper and lower limits of the positional-change angle in a different, suitable manner. It is possible that the detection range of the positional-change angle be divided into a greater number of regions in order to provide a higher level of accuracy of target recognition.

In the present embodiment, it is detected whether the absolute value of the positional-change angle θp falls within one of the angular ranges. The positional-change angle $\theta p$ may be greater than zero or smaller than zero. This is because the tracking operation has to cover targets which are approaching or leaving the vehicle.

It is possible for the radar apparatus of the present invention to provide a high level of accuracy of target recognition which determines the probability of existence of the target having a path in the lane of the vehicle. The radar apparatus of the present invention provides a quantitative expression of the critical condition of the vehicle with the target.

In other words, the fact that the absolute value of the positional-change angle $\theta p$ is small indicates that the target is approaching the vehicle.

When the first requirement conditions: $0° \leq |\theta p| < 10°$ are met, the degree of crisis of the vehicle with respect to the target is very high. At this time, the rate of increase Bup to the existence probability of the target is set at the greatest value and the rate of decrease Bdown to the existence probability of the target is set at the smallest value.

When the second requirement conditions: $10° \leq |\theta p| < 20°$ are met, the degree of crisis of the vehicle with respect to the target is high. At this time, the rate of increase Bup to the existence probability of the target is set at the second greatest value and the rate of decrease Bdown to the existence probability of the target is set at the third greatest value.

When the third requirement conditions: $20° \leq |\theta p| < 30°$ are met, the degree of crisis of the vehicle with respect to the target is low. At this time, the rate of increase Bup to the existence probability of the target is set at the third greatest value and the rate of decrease Bdown to the existence probability of the target is set at the second greatest value.

When $|\theta p| \leq 30°$, the degree of crisis of the vehicle with respect to the target is very low. At this time, the rate of increase Bup to the existence probability of the target is set at the smallest value and the rate of decrease Bdown to the existence probability of the target is set at the greatest value.

Referring to FIG. 7, step S100 determines a lateral width Wt of the target in accordance with the following equation:

$$Wt = R \cdot \tan \theta w \tag{7}$$

where R is the relative distance of the target, and $\theta w$ is the vehicle angle of the target.

Step S102 detects whether the lateral width Wt is below a first reference width W1. The first reference width W1 is preset at about 2 m (meter).

When $Wt \leq W1$, step S104 is performed. Step S104 sets the coefficient Kw at 1 which is the highest.

When $Wt > W1$, step S106 is performed. Step S106 detects whether the lateral width Wt is below a second reference width W2. The second reference width W2 is present at about 4 m (meter).

When $Wt \leq W2$, step S108 is performed. Step S108 sets the coefficient Kw at 0.7 which is the second highest.

When $Wt > W2$, step S110 is performed. Step S110 sets the coefficient Kw at 0.5 which is the lowest.

After one of the steps S104, S108 and S110 is performed, step S112 is performed. Step S112 determines the rate of increase Bup to the existence probability of the target and the rate of decrease Bdown to the existence probability of the target in accordance with the following equations.

$$Bup = Bup \cdot Kw \tag{8}$$

$$Bdown = Bdown / Kw \tag{9}$$

When Kw is equal to 1, the rate of increase Bup to the existence probability of the target and the rate of decrease Bdown to the existence probability of the target remain unchanged. When Kw is smaller than 1, the rate of increase Bup to the existence probability of the target is varied to a smaller value, and the rate of decrease Bdown to the existence probability of the target is varied to a greater value.

Figure 8:
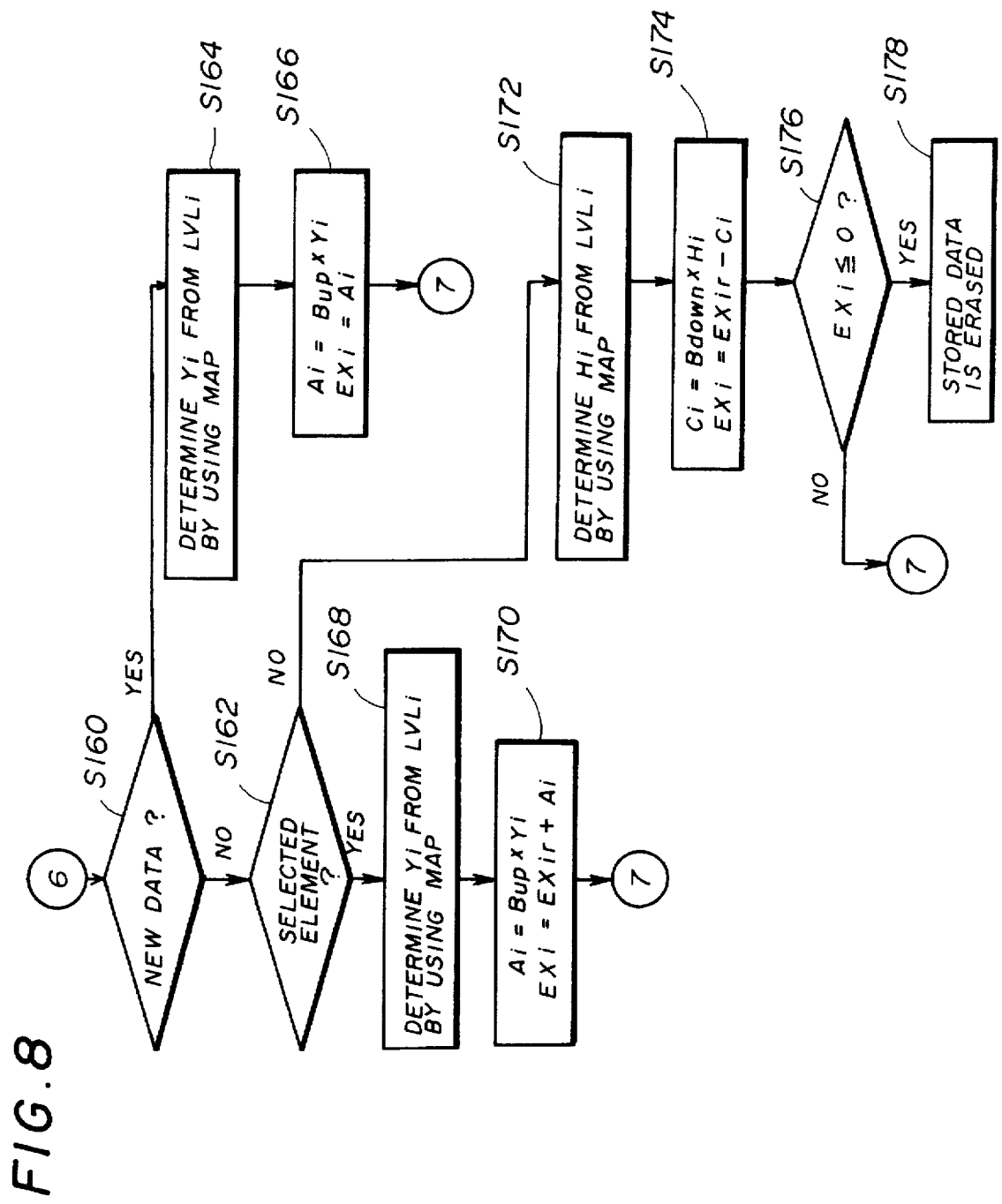

After the step S112 is performed, the control is transferred to step S160 in FIG. 8.

The detection range of the lateral width of the target in the present embodiment may be divided into a greater number of regions by changing the first and second reference widths to smaller values. It is possible to provide a higher level of the accuracy of the lane discrimination of the target if the detection range is divided into a greater number of regions.

When the target is moving into the start of a curved path but the vehicle is still running in a straight path, the path of the target may be erroneously detected to be in the lane of the vehicle even if the actual path of the target is in a different lane adjacent to the lane of the vehicle. The lateral width Wt of the above target is detected to be above the first reference width (2 m). In this case, the coefficient Kw is set at 0.7 which is smaller than 1, and the rate of increase Bup to the existence probability of the target is varied to a smaller value, and the rate of decrease Bdown to the existence probability of the target is varied to a greater value by the radar apparatus of the present embodiment.

Also, a guardrail on a roadside may be detected to be a target having a path in the lane of the vehicle. The lateral width Wt of the guardrail is detected to be above the second reference width (4 m). In this case, the coefficient Kw is set at 0.5 which is smaller than 0.7, and the rate of increase Bup to the existence probability of the target is varied to a still smaller value, and the rate of decrease Bdown to the existence probability of the target is varied to a still greater value by the radar apparatus of the present embodiment.

Accordingly, it is possible for the radar apparatus of the present embodiment to provide a high level of accuracy of target recognition which determines the certainty factor of a target having a path in the lane of the vehicle.

Referring to FIG. 8, step S160 detects whether the element of the presently-determined data for the new target (i) is the new data stored in the memory. When the result at the step S160 is affirmative, it is determined that the target is newly detected and the position of the target is presently stored as the new data, and step S164 is performed.

Step S164 determines a first correction factor Yi from the presently-determined reflection beam level LVLi by using a map indicating the relation of reflection beam level (LVL) and first correction factor (Y).

Figure 13:
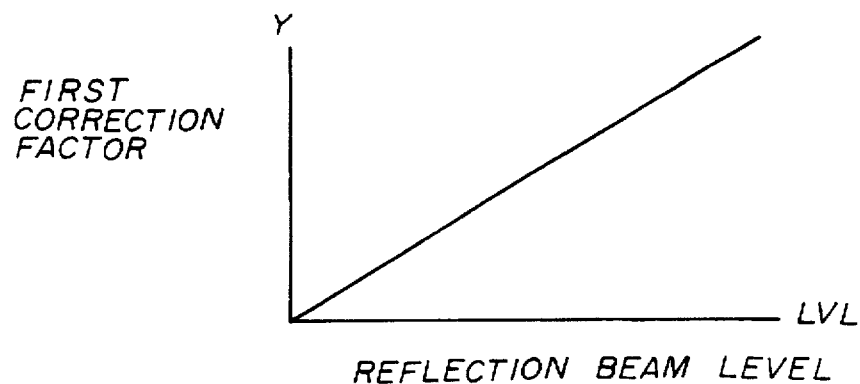
FIG. 13 is a diagram for explaining a map indicating the relation of reflection beam level and first correction factor.

FIG. 13 shows the map indicating the relation of reflection beam level (LVL) and first correction factor (Y). As the reflection beam level LVL increase, the accuracy of the target recognition increases. Therefore, the first correction factor Y is substantially proportional to the reflection beam level LVL.

After the first correction factor Yi is determined, step S166 is performed. Step S166 determines a certainty factor EXi from the rate of increase Bup to the existence probability and the first correction factor Yi in accordance with the following equations:

$$Ai = Bup \cdot Yi$$

$$EXi = Ai \tag{10}$$

The certainty factor EXi indicates the existence probability of the target.

Further, step S166 stores the data (Ri, Vi, LVLi, EXi) of the target in the memory.

After the step S166 is performed, the control is transferred to step S180 in FIG. 9.

On the other hand, when the result at the step S160 is negative, step S162 is performed. Step S162 detects whether the element of the presently-determined data of the target (i) is the same as the selected element of the stored data.

When the result at the step S162 is affirmative, it is determined that the presently-determined position of the target (i) is the same as the selected element of the stored data, and step S168 is performed. Step S168 determines a first correction factor Yi from the presently-determined reflection beam level LVLi in accordance with the map in FIG. 13.

After the first correction factor Yi is determined, step S170 is performed. Step S170 determines a certainty factor EXi from the rate of increase Bup to the existence probability, the first correction factor Yi, and the previously-determined certainty factor EXir in accordance with the following equations:

$$Ai=B \cdot Yi$$

$$EXi=EXir+Ai \qquad (11)$$

After the step S170 is performed, the control is transferred to step S180 in FIG. 9.

On the other hand, when the result at the step S162 is negative, it is determined that the previously-detected position of the target (i) is lost at the present cycle, and step S172 is performed. Step S172 determines a second correction factor Hi from the previously-determined reflection beam level LVLi in accordance with a map indicating the relation of reflection beam level (LVL) and second correction factor (H).

Figure 14:
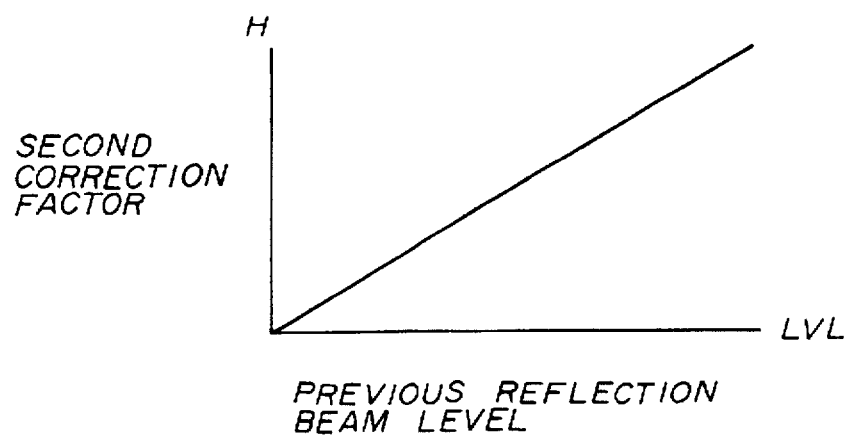
FIG. 14 is a diagram for explaining a map indicating the relation of reflection beam level and second correction factor.

FIG. 14 shows the map indicating the relation of reflection beam level (LVL) and second correction factor (H). As the reflection beam level LVL increases, the accuracy of the target recognition increases. Therefore, the second correction factor H is substantially proportional to the reflection beam level LVL.

After the second correction factor Hi is determined, step S174 is performed. Step S174 determines a certainty factor EXi from the rate of decrease Bdown to the existence probability and the second correction factor Hi in accordance with the following equations:

$$Ci=Bdown \cdot Hi$$

$$EXi=EXir-Ci \qquad (12)$$

where EXir is the previously-determined certainty factor.

After the step S174 is performed, step S176 is performed. Step S176 detects whether the certainty factor EXi determined at the step S174 is less than zero.

When the result at the step S176 is negative (EXi>0), the control is transferred to step S180 in FIG. 9. When the result at the step S176 is affirmative (EXi≦0), step S178 is performed. Step S178 erases the stored data of the target (i) in the memory.

Referring to FIG. 9, step S180 determines a radius of a turning circle of the vehicle based on the steering angle output by the steering angle sensor 44. Alternatively, this turning circle radius may be determined based on a yaw rate output by a yaw rate sensor (not shown).

Step S182 determines a threshold value Z from the turning circle radius (determined at the step S180) in accordance with a map indicating the relation of the turning circle radius and the threshold value.

Figure 15:
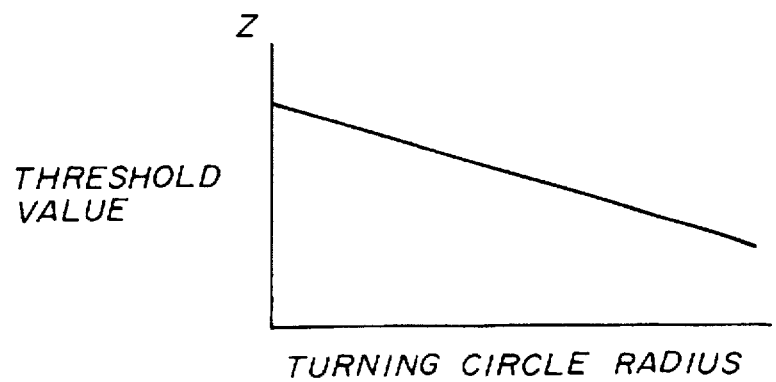
FIG. 15 is a diagram for explaining a map indicating the relation of turning circle radius and threshold value.

FIG. 15 shows the map indicating the relation of the turning circle radius and the threshold value, the map being used by the target recognition unit 30.

When the vehicle is running in a straight path (the turning circle radius is infinite), the accuracy of the target recognition is increased. When the vehicle is running in a curved path (the turning circle radius is relatively small), the accuracy of the target recognition is decreased. By taking into account this relation of the turning circle radius and the accuracy of the target recognition, the map in FIG. 15 is predetermined such that the threshold value Z for a very small turning circle radius is large, and the threshold value Z decreases as the turning circle radius increases.

Step S184 detects whether the certainty factor EXi of each target (i) is above the threshold value Z (which is determined at the step S182). This detection at the step S184 is performed for each of the targets.

For a target having a certainty factor EXi above the threshold value Z (EXi≧Z), step S186 is performed. Step S186 includes the data for such a target in data being subjected to the following process which is performed by the critical-condition detecting unit 32 in FIG. 2.

For a target having a certainty factor EXi less than the threshold value Z (EXi<Z), step S188 is performed. Step S188 eliminates the data for this target from the data being subjected to the following process.

After either the step S186 or the step S188 is performed, the control is transferred to the following process. The following process is a critical-condition detecting process which detects whether the vehicle is in the critical condition with each target, based on the above data subjected to the process. As described above, the process is performed by the critical-condition detecting unit 32 in FIG. 2, and when it is detected that the vehicle is in the critical condition with the target, the alarm unit 34 provides a warning of the critical condition for the vehicle operator.

In the above-described embodiment, the certainty factor indicating the existence probability of a target is determined based on the reflection beam level of the target. It is possible to eliminate, from the data used for the target tracking and critical-condition detecting procedure, the data of the target which exists in the forward direction of the vehicle only for a short time but disappears thereafter. For example, the data for a guardrail on the road or a target vehicle having a path in a different lane of the road as well as noise of the reflection beam can be eliminated. It is possible to prevent such a target from being erroneously detected. Therefore, according to the above-described embodiment, the target tracking and critical-condition detecting procedure can be efficiently performed.

Figure 1:
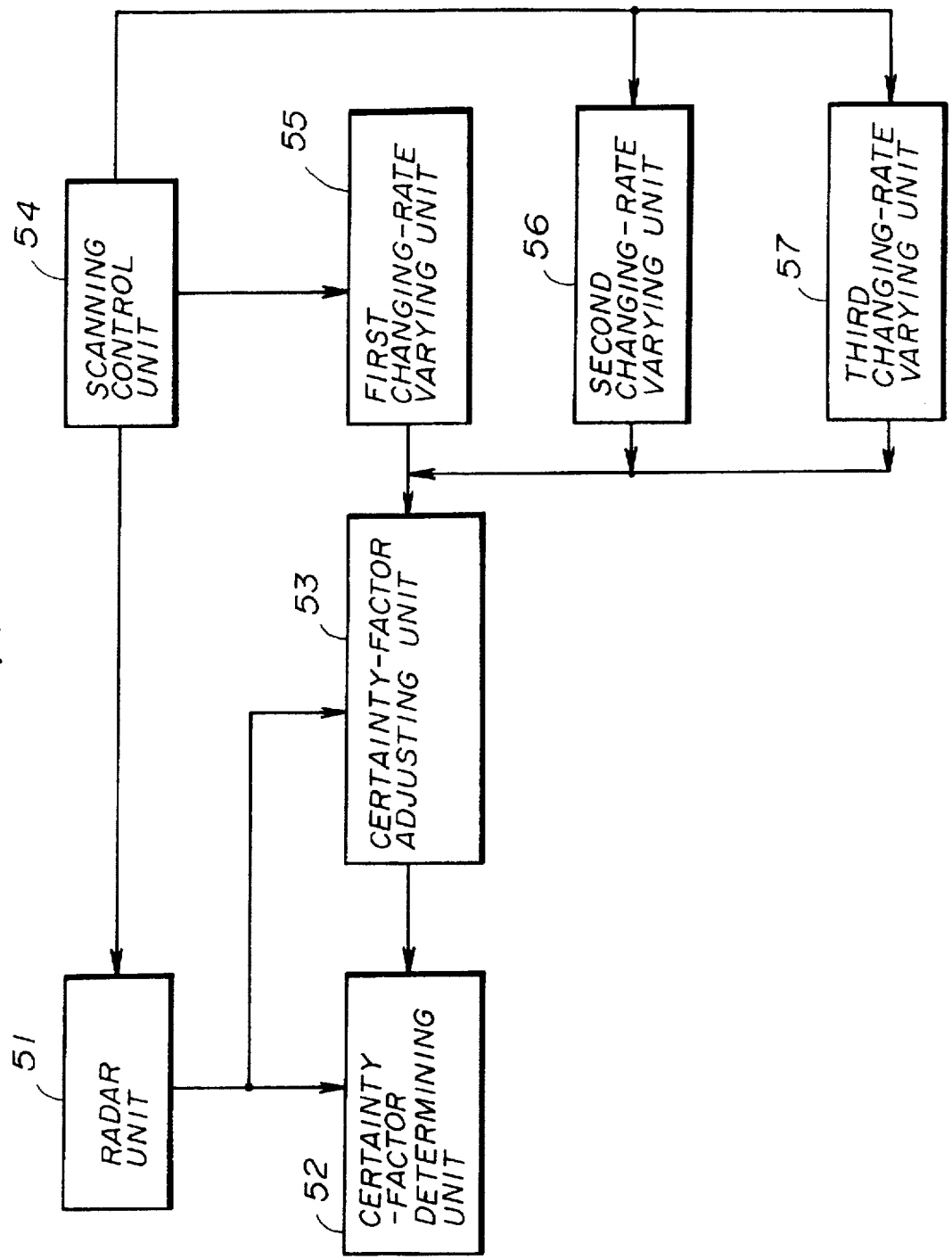
FIG. 1 is a block diagram for explaining the basic elements of a radar apparatus according to the present invention.

FIG. 1 shows the basic elements of the radar apparatus according to the present invention.

Referring to FIG. 1, a radar unit 51 of the radar apparatus is comprised of the above-described elements 10 through 28 in the radar signal processing system in FIG. 2. The radar unit 51 detects a position of a target based on a reflection beam from the target and outputs data related to the detected position.

A scanning control unit 54 of the radar apparatus is comprised of the radar control unit 40 and the scanning controller 46 in the radar signal processing system in FIG. 2. The scanning control unit 54 controls a direction of a beam radiation axis of the radar unit 51 to the target in accordance with a scanning angle.

A certainty-factor determining unit 52 of the radar apparatus is comprised of the target recognition unit 30 in the radar signal processing system in FIG. 2. The certainty-factor determining unit 52 determines a certainty factor of the target based on data presently detected by the radar unit 51 and data previously detected by the radar unit 51.

A certainty-factor adjusting unit 53 of the radar apparatus is comprised of the steps S160 through S178 in FIG. 8 performed by the target recognition unit 30. The certainty-factor adjusting unit 53 controls the certainty factor such that a changing rate to the certainty factor is determined based on the data from the radar unit 51 and the certainty factor is adjusted by the changing rate.

A first changing-rate varying unit 55 of the radar apparatus is comprised of the steps S60 through S74 in FIG. 5 performed by the target recognition unit 30. The first changing-rate varying unit 55 varies the changing rate to one of a plurality of predetermined values based on a target center positional angle to the target, whereby the certainty-factor adjusting unit 53 adjusts the certainty factor by the changing rate.

The radar apparatus according to the present invention appropriately varies the changing rate for adjustment of the certainty factor depending on whether the path of the target is in the lane of the vehicle or in another lane. Therefore, it is possible to remarkably increase the accuracy of lane discrimination of the target which detects whether the path of the target is in the lane of the vehicle or in another lane.

Further, a second changing-rate varying unit 56 of the radar apparatus in FIG. 1 is comprised of the steps S80 through S94 in FIG. 6 performed by the target recognition unit 30. The second changing-rate varying unit 56 determines a positional-change angle indicating a change in the position of the target to the vehicle, and varies the changing rate to one of a plurality of predetermined values based on the positional-change angle, whereby the certainty-factor adjusting unit 53 adjusts the certainty factor by the changing rate.

It is possible for the radar apparatus of the present invention to further increase the accuracy of lane discrimination of the target which detects whether the path of the target is in the lane of the vehicle or in another lane.

Further, a third changing-rate varying unit 57 of the radar apparatus in FIG. 1 is comprised of the steps S100 through S112 in FIG. 7 performed by the target recognition unit 30. The third changing-rate varying unit 57 determines a lateral width of the target having a detected position, and varies the changing rate to one of a plurality of predetermined values based on the lateral width, whereby the certainty-factor adjusting unit 53 adjusts the certainty factor by the changing rate.

It is possible for the radar apparatus of the present invention to further increase the accuracy of lane discrimination of the target which detects whether the path of the target is in the lane of the vehicle or in another lane.

Further, the present invention is not limited to the above-described embodiment, and variations and modifications may be made without departing from the scope of the present invention.

What is claimed is:

1. A radar apparatus of a vehicle, comprising:
    a radar unit for detecting a position of a target based on a reflection beam reflected from the target and for outputting data related to the detected position;
    scanning control means for controlling a direction of a beam radiation axis of the radar unit to the target;
    certainty-factor determining means for determining a certainty factor of the target based on data presently detected by the radar unit and data previously detected by the radar unit;
    certainty-factor adjusting means for controlling the certainty factor such that a changing rate to the certainty factor is determined based on the data from the radar unit, the certainty factor being adjusted by the changing rate; and
    first changing-rate varying means for varying the changing rate to one of a plurality of predetermined values based on a target center positional angle to the target, whereby said certainty-factor adjusting means adjusts the certainty factor by said changing rate.

2. The radar apparatus according to claim 1, wherein said first changing-rate varying means includes a plurality of lane discriminating conditions each of which is defined by a scanning angle to the target, a vehicle-width angle of the target, and an allowance factor.

3. The radar apparatus according to claim 1, wherein said first changing-rate varying means detects which of a plurality of lane discriminating conditions is met by the target center positional angle, said one of the plurality of predetermined values being selected depending on which of the plurality of lane discriminating conditions is met by the target center positional angle.

4. The radar apparatus according to claim 1, wherein said first changing-rate varying means determines a scanning angle θs and a vehicle-width angle θvh in accordance with the equations:

$$\theta s = \sin^{-1}(R/2r)$$

$$\theta vh = \tan^{-1}(W/2R)$$

where R is a relative distance between the vehicle and the target, r is a radius of curvature of a curved path, and W is a predetermined vehicle width of the target.

5. The radar apparatus according to claim 1, wherein said first changing-rate varying means selects one of the plurality of predetermined values for the changing rate depending on which of a plurality of lane discriminating conditions is met by the target center positional angle.

6. The radar apparatus according to claim 1, wherein said certainty factor indicates an existence probability of the target in a forward direction of the vehicle.

7. The radar apparatus according to claim 1, further comprising:
    second changing-rate varying means for determining a positional-change angle indicating a change in two-dimensional position of the target to the vehicle, and for varying the changing rate to one of a plurality of predetermined values based on the positional-change angle, whereby said certainty-factor adjusting means adjusts the certainty factor by said changing rate.

8. The radar apparatus according to claim 7, wherein said second changing-rate varying means determines a positional-change angle θp in accordance with the equation:

$$\theta p = \tan^{-1}(dRx/dRy)$$

where dRx is an x-direction component of a change in position of the target to the vehicle during an interval of time, and dRy is a y-direction component of the change in position.

9. The radar apparatus according to claim 1, further comprising:
    third changing-rate varying means for determining a lateral width of the target having a detected position, and for varying the changing rate based on the lateral width, whereby said certainty-factor adjusting means adjusts the certainty factor by said changing rate.

10. The radar apparatus according to claim 9, wherein said third changing-rate varying means determines a lateral width Wt in accordance with the equation:

$$Wt = R \cdot \tan \theta w$$

where R is a relative distance of the target, and θw is a vehicle angle of the target.

* * * * *